(12) United States Patent
Kim et al.

(10) Patent No.: US 8,154,635 B2
(45) Date of Patent: *Apr. 10, 2012

(54) IMAGE SENSOR AND DIGITAL GAIN COMPENSATION METHOD THEREOF

(75) Inventors: Mi-Rang Kim, Chungcheongbuk-do (KR); Chang-Hee Pyeoun, Chungcheongbuk-do (KR)

(73) Assignee: Intellectual Ventures II LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 12/426,701

(22) Filed: Apr. 20, 2009

(65) Prior Publication Data

US 2009/0201402 A1 Aug. 13, 2009

Related U.S. Application Data

(63) Continuation of application No. 11/081,480, filed on Mar. 15, 2005, now Pat. No. 7,522,202.

(30) Foreign Application Priority Data

May 6, 2004 (KR) .................................. 2004-31993

(51) Int. Cl.
*H04N 5/20* (2006.01)
*H03M 1/12* (2006.01)

(52) U.S. Cl. ....................................... 348/255; 341/139

(58) Field of Classification Search .................. 358/446; 348/222.1, 229.1, 230.1, 678, 685, 255; 341/139, 341/140; 330/284

See application file for complete search history.

(56) References Cited

U.S. PATENT DOCUMENTS

| 4,851,842 | A | 7/1989 | Iwamatsu ...................... 341/139 |
| 5,541,600 | A | 7/1996 | Blumenkrantz et al. ....... 341/139 |
| 5,699,045 | A * | 12/1997 | Frederick et al. ............. 340/551 |
| 6,040,860 | A | 3/2000 | Tamura et al. ................. 348/255 |
| 6,137,533 | A * | 10/2000 | Azim .......................... 348/222.1 |
| 6,441,684 | B1 * | 8/2002 | Nakamura ..................... 330/254 |
| 6,686,957 | B1 * | 2/2004 | Johnson et al. ............. 348/222.1 |
| 6,720,999 | B1 * | 4/2004 | Holberg et al. ............. 348/222.1 |
| 7,440,012 | B2 | 10/2008 | Borg et al. .................. 348/229.1 |
| 2001/0024237 | A1 | 9/2001 | Osada et al. ................. 348/273 |
| 2001/0050625 | A1 | 12/2001 | Piirainen et al. ............. 341/139 |
| 2002/0061738 | A1 | 5/2002 | Simmons et al. .......... 455/234.1 |
| 2003/0001975 | A1 | 1/2003 | Takeda et al. ................ 348/678 |
| 2003/0156667 | A1 | 8/2003 | Nishio ......................... 348/725 |
| 2003/0184661 | A1 | 10/2003 | Yubata et al. .............. 348/229.1 |
| 2004/0046875 | A1 | 3/2004 | Itani et al. .................. 348/229.1 |
| 2004/0232361 | A1 | 11/2004 | Cai ............................ 250/559.1 |
| 2005/0195448 | A1 * | 9/2005 | Llewellyn et al. ............ 358/446 |

FOREIGN PATENT DOCUMENTS

KR 1999-0040827 6/1999

* cited by examiner

*Primary Examiner* — Jason Whipkey

(74) *Attorney, Agent, or Firm* — McAndrews, Held & Malloy, Ltd.

(57) ABSTRACT

An image sensor and digital gain compensation thereof. The image sensor includes a variable amplification device for amplifying an inputted analog image signal as a variable first gain value, an analog-to-digital conversion unit for converting the amplified analog image signal into a digital image signal, and a digital gain compensation device for comparing the first gain value with a reference gain value and compensating the digital image signal as a digital second gain value when the first gain value is less than the reference gain value.

19 Claims, 4 Drawing Sheets

IMAGE SENSOR AND DIGITAL GAIN COMPENSATION METHOD THEREOF

The present patent application is a continuation of application Ser. No. 11/081,480, filed Mar. 15, 2005 now U.S. Pat. No. 7,522,202.

FIELD OF THE INVENTION

The present invention relates to an image sensor; and more particularly, to an image sensor capable of compensating for a loss of a primary color signal at a variable amplification unit and a method for compensating for a digital gain thereof.

DESCRIPTION OF RELATED ARTS

An image sensor is a device that photographs an image with use of a characteristic that semiconductor materials are reactive to light. That is, pixels of the image sensor detect brightness and wavelengths of different lights emitted from individual objects and convert the detected brightness and wavelengths into an electrical value. It is the role of the image sensor to convert this electrical value into a level that can be processed as a signal.

FIG. 1 is a block diagram briefly showing a conventional image sensor.

As shown, the image sensor includes: a pixel array unit 10 including N×M numbers of unit pixels, where N and M are natural numbers; a variable amplification unit 11; an automatic exposure control and exterior system interface unit 12; an analog-to-digital converter (ADC) 13; and an image signal processing unit 14.

The pixel array unit 10 is arranged with N number of pixels in rows and M number of pixels in columns to maximize photo-reactiveness of the pixels, so that the pixel array unit 10 is capable of detecting information on images provided from an external source. Thus, the pixel array unit 10 is an essential part of the image sensor.

The automatic exposure control and exterior system interface unit 12 controls overall operation of the image sensor with use of a finite state machine (FSM) and is in charge of interfacing operation with respect to an exterior system. Although not illustrated, the automatic exposure control and exterior system interface unit 12 includes a batch type register and as a result, the automatic exposure control and exterior system interface unit 12 is capable of programming various pieces of information related to internal operation. Also, the automatic exposure control and exterior system interface unit 12 controls overall chip operation based on the programmed information.

Although not illustrated, those outputted signals from the pixel array unit 10 are inputted to the variable amplification unit 11, for instance, a programmable gain amplifier (PGA), through an analog line buffer unit, a column decoder, an analog bus and so forth. Herein, the variable amplification unit 11 is in charge of analog signal processing operation.

That is, the analog line buffer unit detects voltages of pixels in the selected row and stores the detected data. Also, the analog line buffer unit is configured with a plurality of lines to be used for color interpolation at a rear end and image signal processing. Among the analog data stored in the analog line buffer unit, column data values selected through a control by a column decoder are transmitted to the variable amplification unit 11 through the analog bus.

When the detected voltage levels stored at the analog line buffer unit are low, the variable amplification unit 11 amplifies the detected voltage levels, and the analog data passed through the variable amplification unit 11 are subjected to color interpolation and then, are converted into digital values through the ADC 13.

Although not illustrated, the digitally converted data are stored into a pixel line memory unit configured with various lines for performing designed functions of the image signal processing unit 14 installed at the rear end.

The image signal processing unit 14 is enabled with various functions for improving functionality of the image sensor based on pixel output values stored into the pixel line memory unit. Examples of the various functions of the image signal processing unit 14 are color interpolation, color correction, gamma correction, automatic white balance, automatic exposure and the like.

Meanwhile, the image sensor has a drawback in fixed pattern noise caused by an offset voltage generated because of a slight difference in conditions of executing manufacturing processes. To compensate for the fixed pattern noise, the image sensor adopts a correlated double sampling (CDS) mode in which the image sensor reads a reset voltage signal and a data voltage signal of the individual pixels of the pixel array unit 10 and outputs a difference between the read reset voltage signal and the read data voltage signal.

A brightness value, which is the most sensitive component to human eyes, is obtained by employing a method for adjusting a light collection time of an image sensor or a method for adjusting the variable amplification unit and compensating for the adjustment as in an appropriate brightness value. For instance, even though the light collection time is the same, brightness values are different from each other depending on amounts of inputted light.

Among various methods for adjusting a brightness value, the light collection time adjustment method makes it possible to adjust the brightness component into an appropriate level. However, this light collection time adjustment method is disadvantageous in that a complementary metal oxide semiconductor (CMOS) image sensor uses images in a line-scanning type and thus, an integration value for the individual lines varies when the light collection time is not an integer multiple of an inputted light period. As a result of this varying integration value, there is a problem of inducing a flicker.

Meanwhile, in case that the brightness value is controlled by adjusting a gain of the variable amplification unit, banding noise, i.e., the flicker noise, can be minimized; however, noise generated from pixels is amplified. Therefore, information on an average brightness value with respect to images provided from an external source is compared with a targeted brightness value based on an internal FSM algorithm to select an adequate brightness adjustment method corresponding to a currently applied environment. If the targeted brightness value is greater than the average brightness value when a user environment is changed from a dark site to a bright site, the gain value of the variable amplification unit is set to decrease towards a negative direction for each defined step.

In more detail, when a large amount of light is continuously inputted to the image sensor, the light collection time decreases since the average brightness is greater than the targeted brightness. As a result, if the light collection time is not an integer multiple of the inputted light, the gain value of the variable amplification unit gets to decrease. Especially, a gain value of an analog amplification unit acts as a decremental gain to an inputted signal and thus, being less than a reference gain value which is an integer multiple of 1 in the variable amplification unit.

When a signal level becomes low as the signal value inputted from the pixel array unit 10 is multiplied with a multiple less than the integer 1, an output value of the variable amplification unit is in a range of an input value of the ADC 13, thereby decreasing a dynamic range of a signal level. At this time, a saturation code value of a normal signal level decreases because of the integer multiple less than 1 and thus, being disabled to be saturated. Eventually, the inputted image is outputted in a distorted state.

As described above, when the conventional image sensor is continuously exposed to the bright environment, all data for primary color signals at an active automatic exposure device become saturated. Thus, it is preferable to multiply the gain value of the variable amplification unit, which becomes high due to this continuous exposure, with the multiple less than 1. However, in cast that such analog variable amplification unit is subjected to the multiplication by a decremental multiple, the signal level inputted to the ADC decreases. Hence, it may be difficult to secure an intended dynamic range of the signal level. Also, this difficulty may further result in a problem in that color signals may not be saturated.

SUMMARY OF THE INVENTION

It is, therefore, an object of the present invention to provide an image sensor capable of preventing a decrease in a dynamic signal level caused by multiplication of a decremental multiple at a variable amplification unit and a digital gain compensation method thereof.

In accordance with an aspect of the present invention, there is provided an image sensor, including: a variable amplification unit for amplifying an inputted analog image signal as a variable first gain value; an analog-to-digital conversion unit for converting the amplified analog image signal into a digital image signal; and a digital gain compensation unit for comparing the first gain value with a reference gain value and compensating the digital image signal as a digital second gain value when the first gain value is less than the reference gain value.

In accordance with another aspect of the present invention, there is provided a method for compensating for a digital gain in an image sensor, including the steps of: amplifying an inputted analog image signal as a first gain value being variable; converting the amplified analog image signal into a digital image signal; comparing the first gain value with a reference gain value; and compensating the digital image signal as a second gain value being digital when the first gain value is less than the reference gain value.

BRIEF DESCRIPTION OF THE DRAWINGS

The above and other objects and features of the present invention will become better understood with respect to the following description of the preferred embodiments given in conjunction with the accompanying drawings, in which.

DETAILED DESCRIPTION OF THE INVENTION

An image sensor and a digital gain compensation method thereof in accordance with a preferred embodiment of the present invention will be described in detail with reference to the accompanying drawings.

Figure 1:
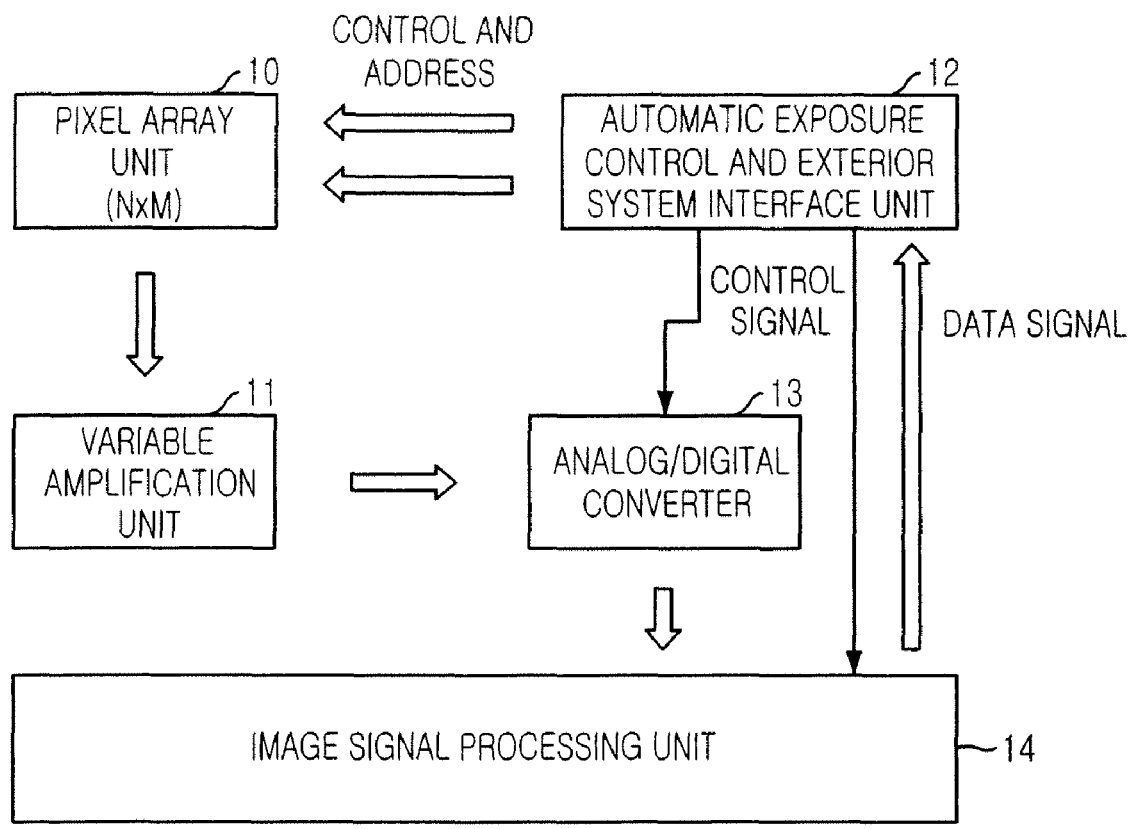
FIG. 1 is a block diagram briefly showing a conventional image sensor.
Figure 2:
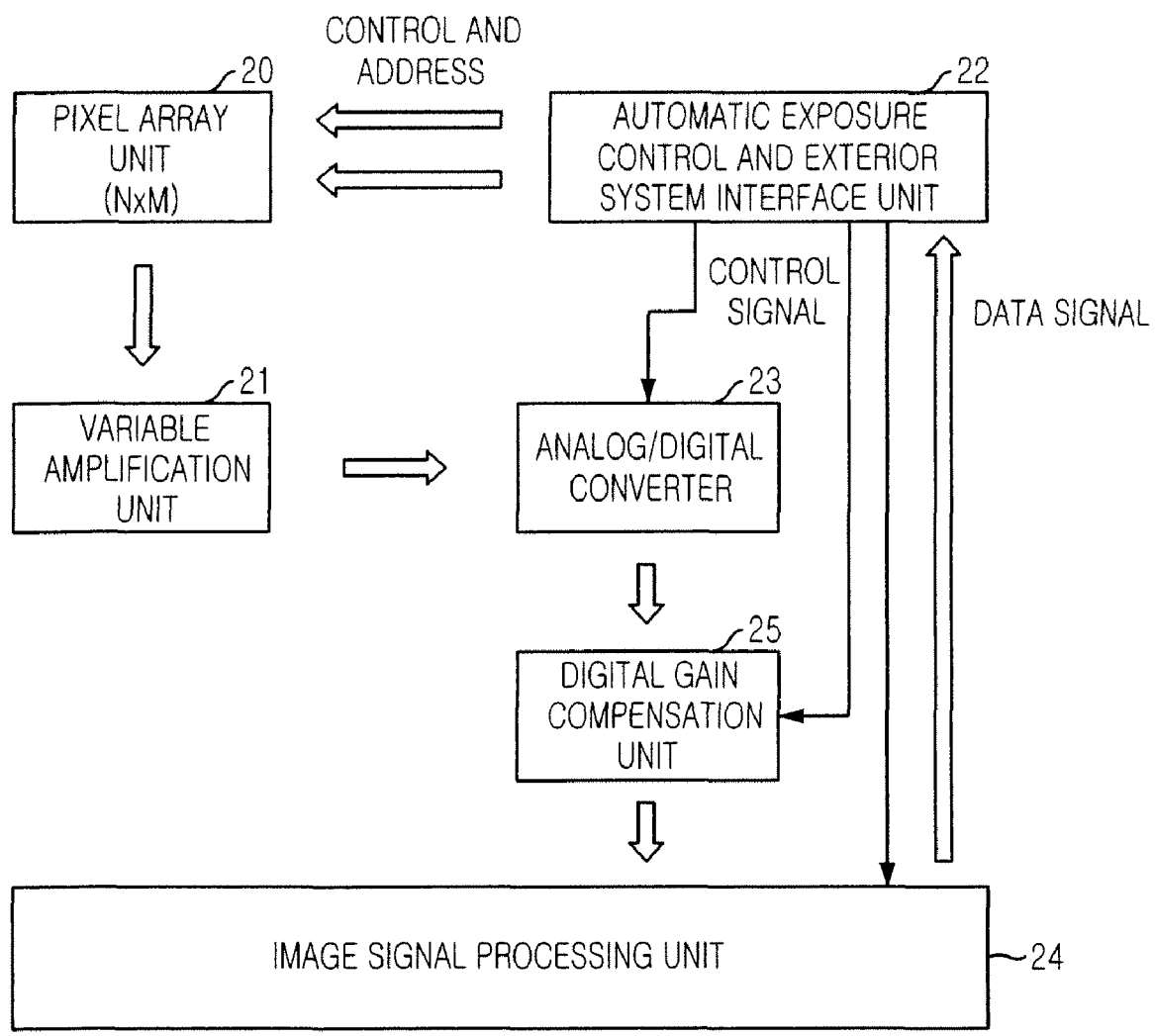
FIG. 2 is a block diagram showing an image sensor in accordance with a preferred embodiment of the present invention.

FIG. 2 is a block diagram showing an image sensor in accordance with a preferred embodiment of the present invention.

As shown, the image sensor includes: a pixel array unit 20; a variable amplification unit 21; an automatic exposure control and exterior system interface unit 22; an analog-to-digital conversion (ADC) unit 23; a digital gain compensation unit 25; and an image signal processing unit 24.

The pixel array unit 20 includes N number of pixels in rows and M number of pixels in columns to maximize reactiveness to light. Herein, N and M are integers. The pixel array unit 20 detects information on images from an external source and outputs the detected information in a signal level, for instance, an analog signal in the format of red, green and blue (RGB).

The automatic exposure control and exterior system interface unit 22 controls overall operation of the image sensor by using a finite state machine (FSM) algorithm and, is in charge of interfacing operation for an exterior system. Although not illustrated, the automatic exposure control and exterior system interface unit 22 includes a batch register. Thus, the automatic exposure control and exterior system interface unit 22 is programmable for various internal operations. Also, the automatic exposure control and exterior system interface unit 22 controls operation of overall chips based on the programmed information.

The variable amplification unit 21 serves a role in receiving an analog image signal and amplifying the received analog image signal as a variable first gain value.

The ADC unit 23 serves a role in converting a variably amplified analog image signal into a digital signal.

The digital gain compensation unit 25 compares the first gain value with a reference gain value and, if the first gain value is less than the reference gain value, the digital image signal is compensated as a second gain value.

The image signal processing unit 24 receives the compensated digital image signal and adjusting color interpolation, color calibration, gamma calibration, automatic white balance and automatic exposure.

Although not illustrated in FIG. 2, the signals outputted from the pixel array unit 20 are inputted to the variable amplification unit 21 which performs analog signal processing operation through employing an analog line buffer unit, a column decoder and an analog bus. A programmable gain amplifier (PGA) is an exemplary device to which the signals from the pixel array unit 20 are inputted.

That is, the analog line buffer unit detects voltages of the pixels in the selected row and stores the detected voltages. Also, the analog line buffer unit is configured with a plurality of lines used for color interpolation and a signal processing at a rear end. Column data selected among analog data stored into the analog line buffer unit through a control of the column decoder are transmitted to the variable amplification unit 21 through the analog bus.

When those voltages of the pixels are low at the analog line buffer unit, the variable amplification unit 21 amplifies the low voltage levels. Then, the analog data passed through the variable amplification unit 21 are subjected to color interpolation and other processes and are subsequently converted into digital values by the ADC unit 23.

The variable first gain value of the variable amplification unit 21 is adjusted correspondingly based on an average brightness value of the inputted image data.

The individual digital data are compensated as a second gain value through the use of the digital gain compensation unit 25 when the first gain value is less than the reference gain value. Although not illustrated, this second gain value is stored into a pixel line memory unit configured with a plurality of lines for performing various functions of the image signal processing unit 24 at the rear end.

As mentioned, the image signal processing unit 24 includes various functions for improving functionality of the image sensor based on the pixel output values stored into the pixel line memory unit. Examples of the functions of image signal processing unit 24 are color interpolation, color calibration, gamma calibration, automatic white balance, automatic exposure and the like.

Meanwhile, in the image sensor, there is generated inevitable fixed pattern noise caused by an offset voltage since reliability of the image sensor is not perfectly coherent because of a slight difference in manufacturing conditions. To compensate for the fixed pattern noise, the image sensor adopts a correlated double sampling (CDS) mode that sequentially reads a reset signal and a data signal at each pixel of the pixel array unit 20 and outputs a difference between the read rest signal and the read data signal thereafter.

The above preferred embodiment exemplifies that the reference gain value is approximately 1. However, the reference gain value is in a range from approximately 1.5 to approximately 1.75 with consideration of various factors during the actual circuit operation. Also, the second gain value is obtained by dividing the reference gain value by the first gain value. The digital gain compensation unit 25 includes a multiplier and the like. The first gain value ranges from approximately 0.5 to approximately 2.5, and the image signal is in the RGB format.

Figure 3:
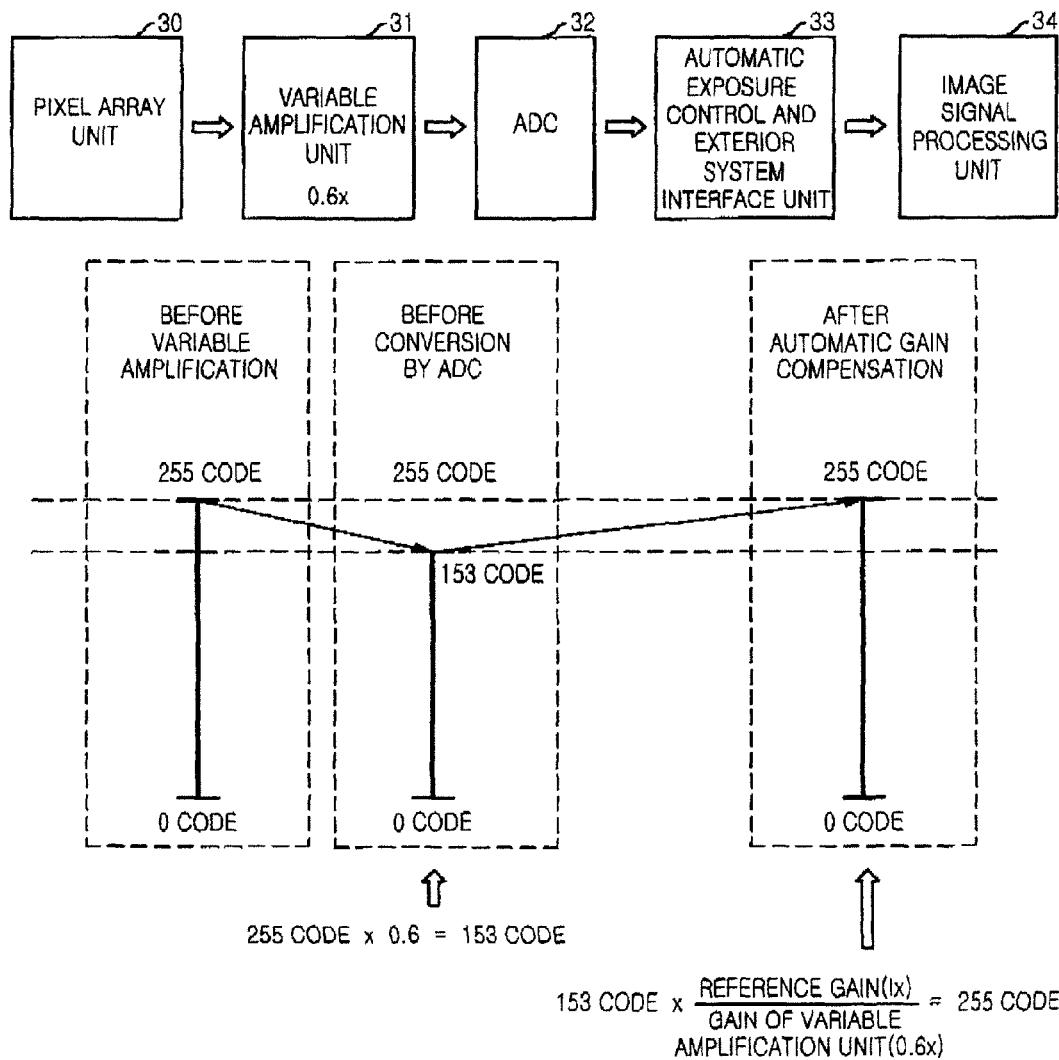
FIG. 3 is a diagram showing changes in operation areas of an analog-to-digital conversion unit and saturation codes in case that a decremental multiple of a variable amplification unit is approximately 0.6 in accordance with the preferred embodiment of the present invention.

FIG. 3 is a diagram showing changes in operation areas of an ADC unit and saturation codes when a decremental multiple of a variable amplification unit is approximately 0.6 in accordance with the present invention.

As an average brightness value of image signals outputted from a pixel array unit 30 is greater than a targeted brightness value, a variable amplification unit 31 carries out the amplification to attenuate a level of the image signal in a decremental multiple of approximately 0.6. That is, the image signal level decreases by about 60% of an original 255 code. That is, the image signal level decreases from an original 255 code to a 153 code. Therefore, when the attenuation occurs at the variable amplification unit 31, an automatic gain compensation unit 33 compensates for the signal attenuation by multiplying a second gain value which is an inverse of a first gain value of the variable amplification unit 31, i.e., approximately 1/0.6, with an image signal converted into a digital image signal through the use of the ADC unit 32. At this time, inversing the first gain value for estimating the second gain value takes place when a reference gain value is 1. Therefore, the digital image signal provided from an image signal processing unit 34 is adjusted into the original 255 code, which is the original signal level.

To prevent the signal level from decreasing at the variable amplification unit 31 and adjusts an image in a full scale of the original code from approximately 0 to approximately 255, a gain value of the variable amplification unit 31 is compared with an anti-banding gain value, and according to the comparison result, a percentage of the gain is augmented to restore a decreased range of the signal level.

Figure 4:
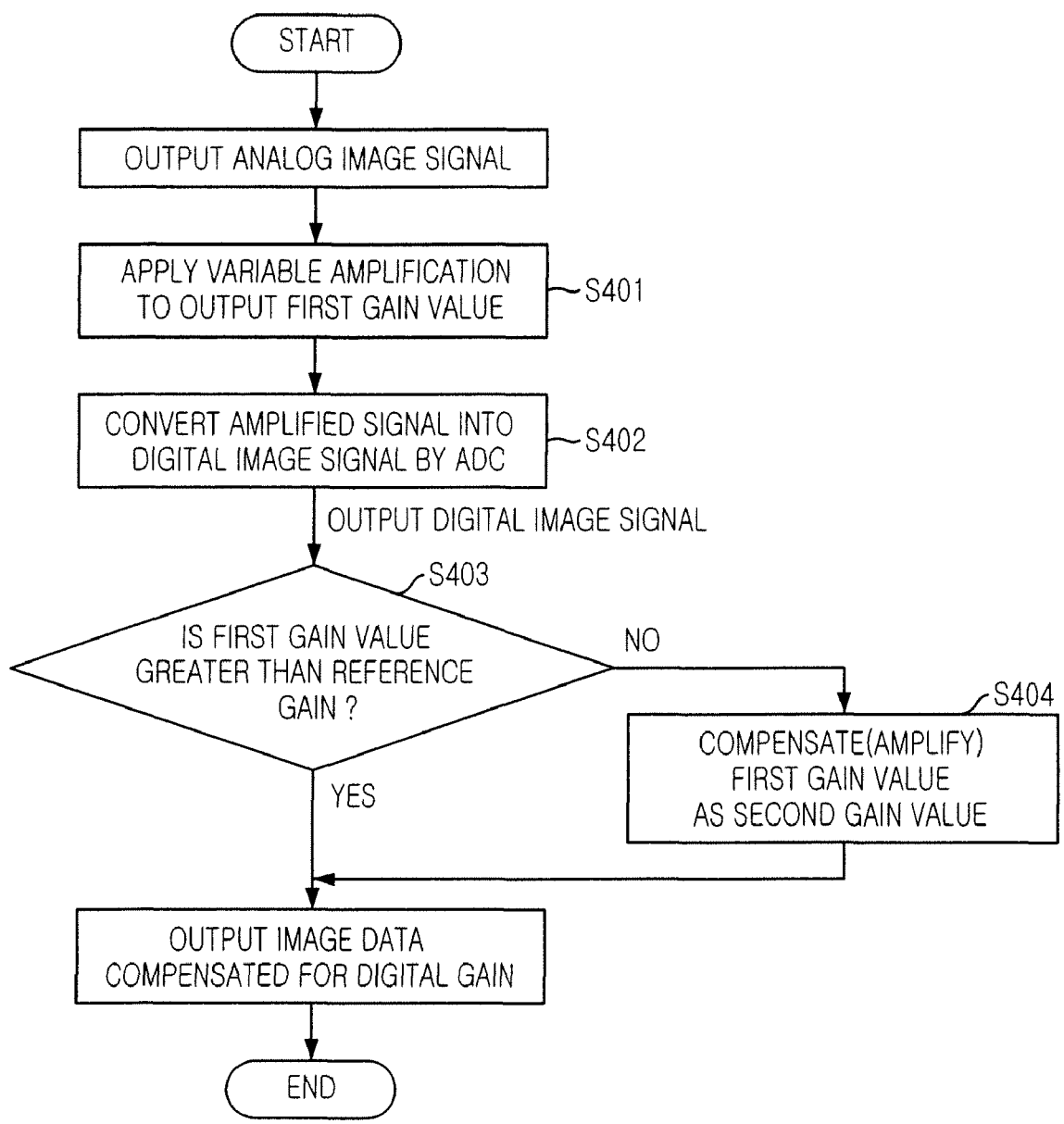
FIG. 4 is a flowchart schematically describing a method for compensating for a digital gain of an image sensor in accordance with the preferred embodiment of the present invention.

FIG. 4 is a flowchart schematically describing a digital gain compensation method of an image sensor in accordance with the present invention. Herein, the same reference numerals are used for the same configuration elements described in FIG. 2.

A large amount of light is continuously inputted to an image sensor from an active automatic exposure device, and then, an analog image signal is outputted through a pixel array unit 21. Once the analog image signal is outputted, at step S401, the variable amplification unit 21 adjusts a signal level based on a first gain value, i.e., the decremental multiple of approximately 0.6, so as to adjust a data on saturated primary color signals. From this adjustment by the variable amplification unit 21, RGB color signals of which code decreases by approximately 102 codes are outputted. On the other hand, if a small amount of light is inputted to the image sensor from the active automatic exposure device, the first gain value becomes greater than a reference gain value, in this case, '1'.

When the data on primary color signals is adjusted in the aforementioned decremental multiple of approximately 0.6, a maximum code range at an area for improving images in later steps is approximately 153, thereby expressing primary color signals within this maximum code range of approximately 153. Thus, this adjustment results in outputs of the severely distorted primary color signals instead of the exactly intended primary color signals.

Next, at step S402, the data on primary color signals amplified into the first gain value is converted into digital image signal through the ADC unit 23.

At step S403, to make a compensation for a dynamic data range of a 255 code, the first gain value of the variable amplification unit 23 is compared with the reference gain value in the course of applying the above adjustment with the decremental multiple of approximately 0.6. At step S404, when it is determined to apply the decremental multiple, the digital image signals are compensated as a second gain value. That is, the variably amplified primary color signals are multiplied with a multiple obtained by dividing the reference gain value by the first gain value. As a result, pixel data are secured with the original 255 code, thereby outputting image data compensated with the digital gain.

In accordance with the present invention, the digital gain compensation unit enabled with changing a digital gain value by being programmable by a user is employed to compensate for a range of code losses of the primary color signals caused by a decremental multiple of the variable amplification unit when a large amount of light is continuously inputted to the image sensor. A multiplier is one example of the digital gain compensation unit. Thus, through a simple configuration of hardware like the multiplier, it is possible to secure a dynamic range of signals and maintain a saturation range consistently. As a result, there is further provided effect on restoration of the accurate image information.

When an image sensor is exposed to various environments during designing of chips for the image sensor for adjustment of an automatic exposure, a dynamic range of the signal varies depending on the displaced environment. According to the present invention, these varying signal levels are expressed with codes uniformly ranging from approximately 0 to approximately 255 and, the dynamic range is secured such that white color is expressed much whiter at a higher code. This effect further makes it possible to maintain a saturation range uniformly.

The present application contains subject matter related to the Korean patent application No. KR 2004-0031993, filed in the Korean Patent Office on May 6, 2004, the entire contents of which being incorporated herein by reference.

While the present invention has been described with respect to certain preferred embodiments, it will be apparent to those skilled in the art that various changes and modifications may be made without departing from the spirit and scope of the invention as defined in the following claims.

What is claimed is:

1. An image sensor, comprising:
a variable amplification means for amplifying an input analog image signal as a first gain value;
an analog-to-digital conversion means for converting the amplified analog image signal into a digital image signal; and
a digital gain compensation means for comparing the first gain value with a reference gain value and compensating the digital image signal as a digital second gain value responsive to the first gain value being less than the reference gain value.

2. The image sensor of claim 1, wherein the reference gain value is approximately 1.

3. The image sensor of claim 1, wherein the digital gain compensation means performs a multiplication operation.

4. The image sensor of claim 1, wherein the first gain value ranges from approximately 0.5 to approximately 2.5.

5. The image sensor of claim 1, wherein the image signal is in a format of red, green and blue (RGB).

6. The image sensor of claim 1, further including a pixel array unit for outputting the analog image signal.

7. The image sensor of claim 1, further including an image signal processing means for receiving the compensated digital image signal and adjusting color interpolation, color calibration, gamma calibration, automatic white balance and automatic exposure.

8. A method comprising:
amplifying an input analog image signal as a first gain value;
converting the amplified analog image signal into a digital image signal;
comparing the first gain value with a reference gain value; and
compensating the digital image signal as a second gain value in response to the first gain value being less than the reference gain value.

9. The method of claim 8, wherein the reference gain value is approximately 1.

10. The method of claim 8, further comprising outputting the digital image signal responsive to the first gain value being greater than the reference gain value.

11. The method of claim 9, wherein the first gain value ranges from approximately 0.5 to approximately 2.5.

12. An image sensor, comprising:
a variable amplification unit configured to amplify an input analog image signal as a first gain value;
an analog-to-digital converter configured to convert the amplified analog image signal into a digital image signal; and
a digital gain compensation unit configured to compare the first gain value with a reference gain value and compensate the digital image signal as a digital second gain value responsive to the first gain value being less than the reference gain value.

13. The image sensor of claim 12, wherein the reference gain value is approximately 1.

14. The image sensor of claim 12, wherein the second gain value is obtained by dividing the reference gain value by the first gain value.

15. The image sensor of claim 12, wherein the digital gain compensation unit is configured to perform a multiplication operation.

16. The image sensor of claim 12, wherein the first gain value ranges from approximately 0.5 to approximately 2.5.

17. The image sensor of claim 12, wherein the image signal is in a format of red, green and blue (RGB).

18. The image sensor of claim 12, further including a pixel array unit configured to output the analog image signal.

19. The image sensor of claim 12, further including an image signal processor configured to receive the compensated digital image signal and adjust color interpolation, color calibration, gamma calibration, automatic white balance and automatic exposure.

* * * * *